Aug. 30, 1966  J. F. GRUNDMANN  3,269,298
FLUID FLOW CONTROL APPARATUS
Filed Oct. 16, 1963  3 Sheets-Sheet 1

Inventor
JOHN F. GRUNDMANN
by KENDRICK & STOLZY
Attorneys

Aug. 30, 1966  J. F. GRUNDMANN  3,269,298
FLUID FLOW CONTROL APPARATUS
Filed Oct. 16, 1963  3 Sheets-Sheet 2
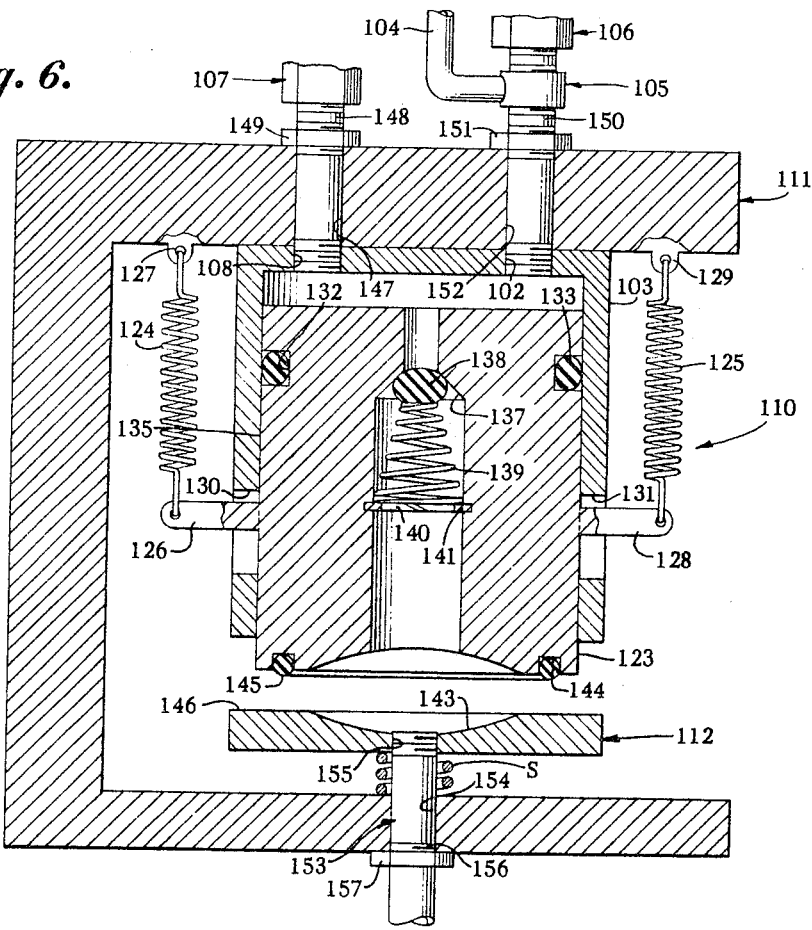
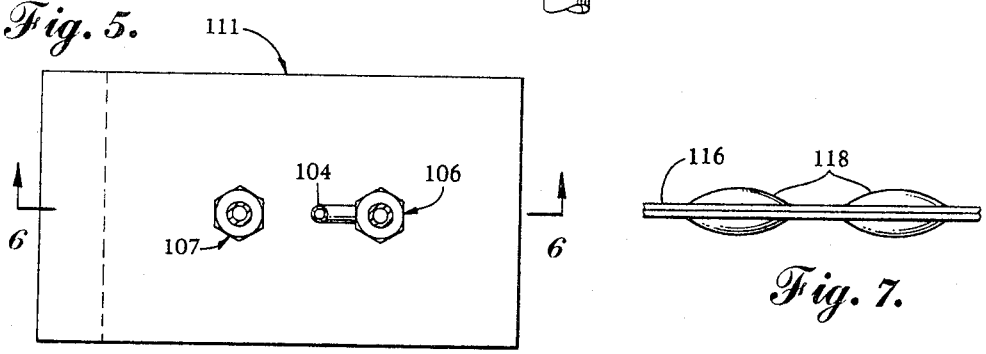
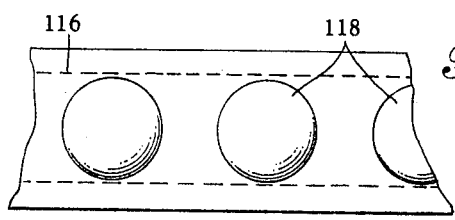
INVENTOR
JOHN F. GRUNDMANN
by KENDRICK & STOLZY
Attorneys Aug. 30, 1966   J. F. GRUNDMANN   3,269,298
FLUID FLOW CONTROL APPARATUS
Filed Oct. 16, 1963   3 Sheets-Sheet 3
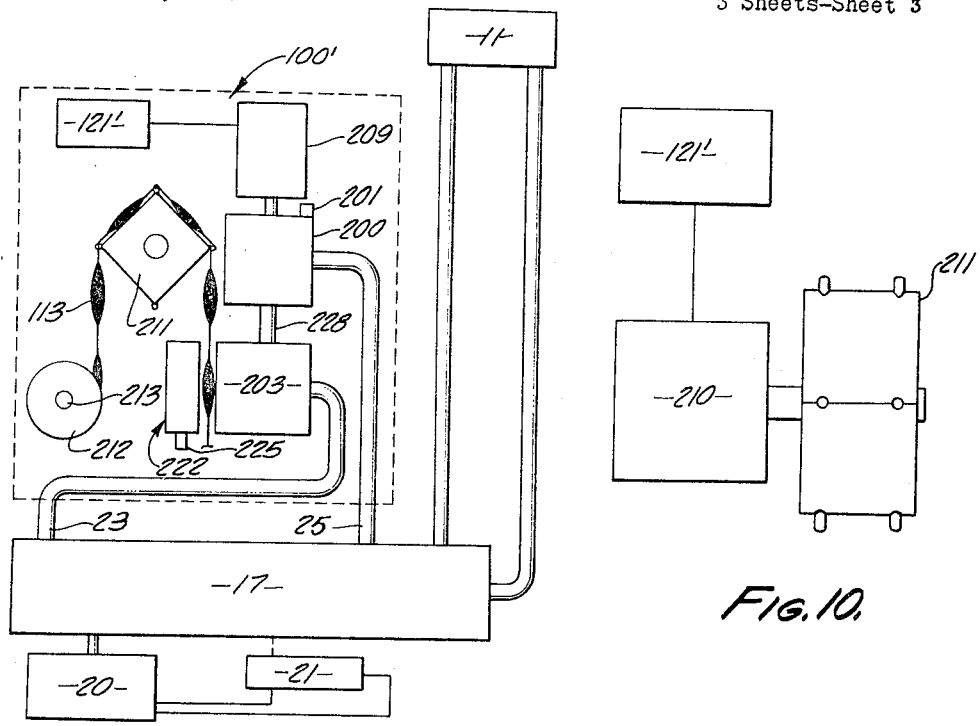
FIG. 9.
FIG. 10.
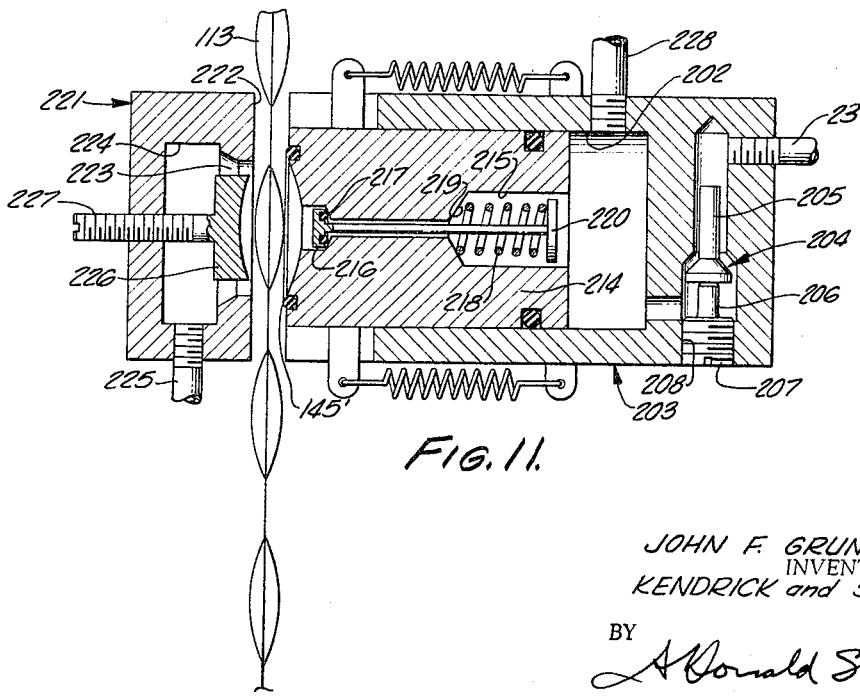
FIG. 11.
JOHN F. GRUNDMANN
INVENTOR.
KENDRICK and STOLZY
BY
A. Donald Stolzy
ATTORNEYS

United States Patent Office 3,269,298
Patented August 30, 1966

3,269,298
FLUID FLOW CONTROL APPARATUS
John F. Grundmann, 651 S. Irena Ave.,
Redondo Beach, Calif.
Filed Oct. 16, 1963, Ser. No. 316,753
4 Claims. (Cl. 99—289)

This invention relates to the art of handling fluids, and more particularly to fluid dispensing apparatus.

This application is a continuation-in-part of co-pending application Serial No. 149,567, filed November 2, 1961, by John F. Grundmann for Method of and Apparatus for Controlling Fluid Flow, and now Patent Number 3,161,206.

Although the present invention will have application in a great many fields and is not therefore to be limited to any particular one such as one of those described herein, it has been found especially useful in the control of the circulation of hot water in coin-operated vending machines which dispense brewed coffee, brewed coffee being distinguished from coffee made by mixing a pulverized dehydrated coffee bean extract or "instant" coffee with hot water. One such machine is disclosed in said co-pending application Serial No. 149,567.

Although the machine of the said application is useful in the form in which it is disclosed therein; under some circumstances it may be desirable to construct an unusually inexpensive hot water dispenser head which may be easily and quickly operated. In addition, it may also be desirable to employ an unusually low fluid flow energy loss arrangement in conjunction with a fluid flow control system disclosed in the said application.

The device of the present invention incorporates an inexpensive hot water dispenser head which may be easily and quickly operated. The present invention also provides a low fluid flow energy loss arrangement in providing stronger and more palatable brewed coffee than it has been possible to provide with automatic brewed coffee vending machines of the prior art.

The advantages of the dispenser head of the present invention are achieved through the use of dispenser means, seat means to form a fluid tight seal with the dispenser means and the seat means when these means are in physical contact with each other. In such a case, one of the dispenser and seat means are movable relative to the other one. Source means are then provided to supply fluid under pressure to the dispenser means. Actuator means are also provided that are responsive to the pressure of the supply fluid to force the dispenser and seat means in contact with each other.

In one embodiment of the invention, the source means may be a rotary type displacement or gear pump. The fluid of course, in the case of an automatic brewed coffee vending machine, is hot water. Thus, the pump which supplies hot water under pressure to force it outwardly of the dispenser means and circulate it through a water permeable packet of coffee grounds may also supply hydraulic pressure to the dispenser means to move it to a position in sealing engagement with the seat means around the coffee bag. Such a dispenser means thus is less expensive than those of the prior art, in that no spare means are necessarily provided to move the dispenser or seat means into physical contact with each other. The dispenser of the present invention is, for the same reason, one which may be easily and quickly operated.

The advantages of the low fluid flow energy loss arrangement of the device of the present invention are achieved through the use of a fluid reservoir having inlet and outlet ports, means to heat fluid in the reservoir, dispenser means having first and second ports, a pump connected from the inlet port to the second port, a first normally open valve connected from the inlet port to the first port and a second normally open valve connected from the second port to the inlet port. In this case, both of the valves are adapted to be closed by fluid pressure created during the operation of the pump.

The foregoing arrangement is especially adapted to be operative with the method and apparatus disclosed in the said application, wherein use is made of the physical phenomenon that hot water has a density less than that of cold water. Use of this physical phenomenon is made to keep the dispensing apparatus of the machine hot so that coffee dispensed by the machine will have a substantially constant temperature regardless of the demand on the machine.

For example, during coffee breaks in places of business, the machine demand may be one cup per minute whereas the demand on the machine for the weekend may be zero. Due to the fact that water carrying tubing connected from a heated supply tank to a dispensing valve, the valve itself, and other connected high heat conducting metal structures in the machine may be cold on a Monday morning, the first cup of coffee dispensed by the machine on a Monday would likely be cold.

As stated previously, the apparatus of the machine of the said application overcomes this problem and the above noted low fluid flow energy loss of the present invention is adaptable for use with such a system. The advantages of a low fluid flow energy loss is accomplished by employing a pump directly connected from the reservoir to the dispensing means. This is an improvement over the structure disclosed in FIG. 1 of the said application, in that the device of the present invention, including the pump, is not required to take an input from a hot water tank or reservoir through any valve, whereas the device for supplying water under pressure disclosed in the said application is required to take water from a hot water tank through a valve, i.e. valve 28 shown in FIG. 1 of the said application.

In accordance with the apparatus of the present invention, a more palatable and stronger coffee is brewed less expensively in that fewer grounds are required. This apparatus includes means for flowing hot water through coffee grounds while they are held in a position packed tightly together.

In accordance with another embodiment of the present invention, interconnected packets of ground coffee are lowered vertically through a brewing head. This makes it unnecessary to draw wet filter paper through the brewing head since the same will drop through it by force of gravity. This, in turn, makes an accurate indexing of the interconnecting packets possible.

In accordance with another feature of the present invention, when hot water is passed through coffee grounds packed tightly together, the water may be projected through a paper filter pack of coffee grounds at the center thereof and forced outwardly through the grounds radially from the center. A more palatable and stronger coffee liquor may thus be obtained.

The above-described and other adantages of the present invention will be better understood from the following description when considered in connection with the accompanying drawings.

In the drawings which are to be regarded as merely illustrative:

FIG. 5 is a top plan view of a pair of valves and dispenser means shown in FIG. 1;

FIG. 6 is a sectional view taken on the line 6–6 of the dispenser means shown in FIG. 5;

FIG. 7 is a broken side elevational view of a strip of filter paper packets of coffee grounds;

FIG. 8 is a top plan view of the strip shown in FIG. 7;

FIG. 9 is a schematic diagram of another embodiment of the present invention similar to the diagram shown in FIG. 1;

FIG. 10 is a front elevational view of a coffee pack sprocket shown in FIG. 9; and FIG. 11 is a longitudinal sectional view of a brewing head shown in FIG. 9.

Figure 1:
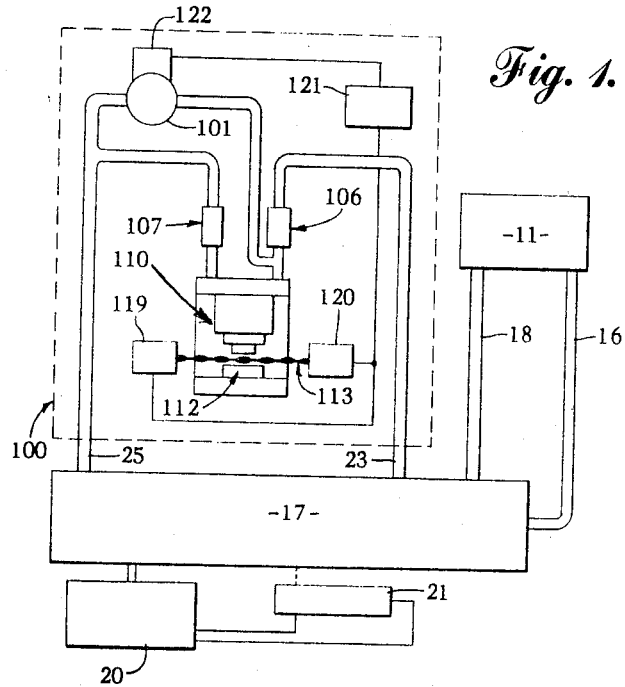
FIG. 1 is a schematic diagram of one embodiment of the present invention.

In the drawings in FIG. 1, an automatic brewed coffee dispensing machine is shown including water supply means 11, including a standpipe 18 and a water supply pipe 16 connected to a hot water tank or reservoir 17 which is heated by a power source 20 and thermostat 21 connected thereto. Tank 17 is provided with an output pipe 25 and an input pipe 23 that are connected to further dispensing apparatus indicated generally at 100. All of the structures 11, 16, 17, 18, 20, 21, 23 and 25 may be identical to those shown in the said co-pending application.

The further dispensing means 100 may be different from those disclosed in the said application. These structures include a hot water pump 101 connected from output pipe 25 to a port 102 in a cylinder 103 through a pipe 104 connected to a pipe T 105 shown in FIG. 6. The lower end of pipe T 105 is threaded into cylinder 103 and the upper end is threaded into valve 106.

As shown in FIG. 1, a valve 107 is also connected from output pipe 25 to another port 108 in cylinder 103 through a pipe nipple 109 threaded thereinto. Valve 106 is connected from input pipe 23 to pipe T 105 in the manner aforesaid.

Dispensing means 110 are also shown in FIG. 1 connected to fixed support means 111 which carries seat means 112 slidable vertically downwardly therethrough against the reaction of a coiled spring S.

In accordance with the present invention, each time a cup of coffee is brewed, hot water is passed through a packet of coffee grounds held by a different cavity in a pair of bonded strips of filter paper. Each cavity is provided in a continuous length of the two strips of filter paper. This coffee grounds containing means is indicated generally at 113 in FIG. 7, including filter paper strips 114 and 115 having flat marginal portions indicated at 116 and 117 in FIG. 8. Cavities are provided inbetween unbonded portions of strips 114, as shown at 118 in both FIGS. 7 and 8.

Means 113 is again shown in FIG. 1 extending from a reserve supply roll thereof indicated diagramatically at 119 and a takeup roll indicated diagrammatically at 120. Rolls 119 and 120 are electrically operated to perform an index movement to place successively coffee ground containing cavities 118 between dispensing means 110 and seat 112. Any conventional index mechanism employing a Geneva movement or otherwise may be employed for this purpose. For example, mechanism 119 may be a roll having friction means to permit yielding rotation thereof as means 113 is dispensed. Means 120 may include a roll having a ratchet wheel fixed thereto with a spring biased pawl or detent means and a separate motor to advance the roll. A timer is provided at 121 to operate mechanisms 119 and 120. Timer 121, which also may be conventional, likewise operates an electric motor 122 which drives pump 101 for a predetermined length of time during which it is desired that coffee be dispensed.

of the present invention, the use of a valve in the connection of pump 101 directly from output pipe 25 is avoided in a system for inexpensively keeping all of the structure through which hot water passes in the dispensing means 100 hot regardless of the demand on the machine shown in FIG. 1. Some of this structure is described in the said co-pending application and appropriate parts thereof are disclosed in FIG. 1. in the instant case. This structure includes output pipe 25, valve 107, valve 106 and input pipe 23. In such a case, hot water can flow upwardly through output pipe 25, through valve 107, into cylinder 103, through port 108, out of port 102, through valve 106 and downwardly through input pipe 23. Although insulation is left off of passage 25 in the said co-pending application and is provided on pipe 23 in order to make the difference in temperature between water in these respective pipes cause circulation therethrough, it is of course not necessary since water in output pipe 25 will naturally always be hotter than water in input pipe 23 due to radiation and conduction therefrom during circulation. Since valves 106 and 107 are normally open, water in input pipe 23 will be colder than water in output pipe 25 and therefore will fall back to reservoir 17, whereas water in output pipe 25 will rise. This circulation keeps dispensing means 110 hot so that the temperature of coffee dispensed by the machine shown in FIG. 1 will be at a substantially constant temperature regardless of the demand upon the machine.

The device of the present invention permits this improved circulation system to be operative, but does not require the use of a valve in the connection from output pipe 25 to pump 101 to induce any unusually high fluid flow energy loss in the system.

In addition to the foregoing, the device of the present invention incorporates dispensing means 110 which may be made inexpensively to be operative in response to the hydraulic pressure within cylinder 103 to move a piston 123 shown in FIG. 6 into sealing engagement with seat means 112 around a filter paper cavity 118, whereby hot water may be passed therethrough to brew coffee. Hence, no special means other than pump 101 need be provided to lower piston 123. Piston 123 for the same reason may be easily and quickly operated.

Figure 2:
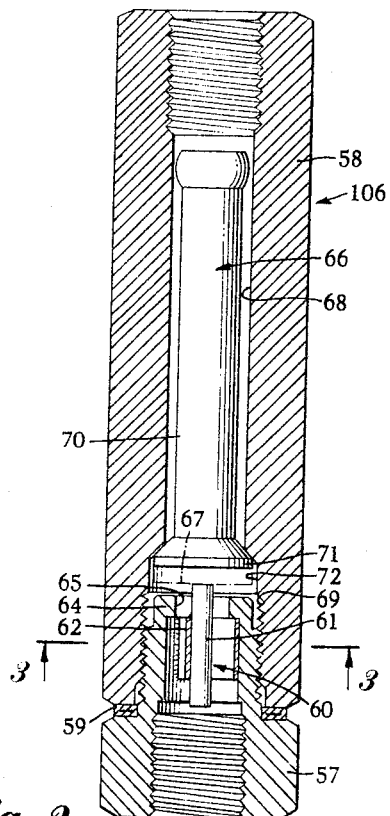
FIG. 2 is a longitudinal sectional view of a valve, two of which are employed in the embodiment of the invention shown in FIG. 1.
Figure 4:
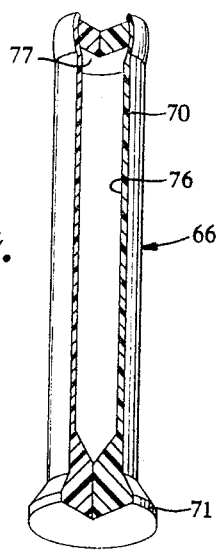
FIG. 4 is a perspective view partly in section of a valve poppet which may be employed with the valve shown in FIGS. 2 and 3.
Figure 3:
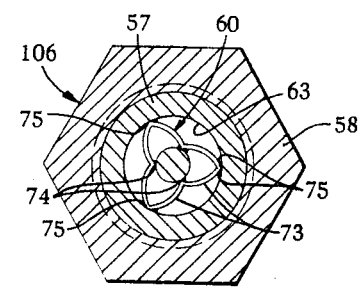
FIG. 3 is a transverse sectional view of the valve shown in FIG. 2.

Valves 106 and 107 may be identical. For this reason, only the construction of valve 106 will be described in detail. In FIG. 2, valve 106 is illustrated including a fitting 57 fitted into a housing 58. An O-ring 59 is provided between fitting 57 and housing 58. A spider assembly 60 is located in the upper end of fitting 57 to support a stop pin 61 therein, stop pin 61 being welded to a spider 62 which in turn is welded to an internal bore 53 in fitting 57. Ftting 57 is provided with a flange at 64 having a bore 65 therein to permit the flow of fluid in either direction to fitting 57. A pin 61 prevents a poppet 66 from falling further in housing 58 than the dotted line position shown at 67. Due to the fact that valves 106 and 107 are normally open valves, the dotted line position 67 of poppet 66 thus indicates its position when opened. It should be noted at this point that the valve 106 shown in FIGS. 2, 3 and 4 is identical to the valves shown in FIGS. 2, 3 and 5, respectively, in the said co-pending application with one exception. A poppet 66 shown in FIG. 4 in the instant case is hollow, as is the poppet 66 shown in FIG. 5 of the co-pending application, in order that the poppet 66 can have an average density close to, but not equal to, that of hot water. This makes the valves 106 and 107 very sensitive to a differential pressure thereacross. However, the valve 29 shown in the said co-pending application employs a poppet 66 which has an average density less than that of hot water, whereas the average density of the poppet 66, shown in FIG. 4 of the instant case is slightly greater than that of hot water.

In the valve 106, fluid can flow in either direction around poppet 66 provided that pressure below poppet As stated previously, in accordance with one feature 66 is not sufficient to cause valve 106 to close. As can be seen in the system of FIG. 1, a low rate of water flow exists downwardly through valve 107 in its vertical location as shown in FIG. 1 in the instant case. Both of the valves 106 and 107 are located vertically and employ a poppet 66 which is gravity operated. However, the low hot water flow provided to keep dispenser means 110 hot in between demand for coffee, does not tend to close valve 107. This is not true of valve 106. Valve 106 is located in vertical position as indicated in FIG. 2, as is valve 107. However, the said low fluid flow is upwardly through valve 106 from pipe T 105. Nevertheless, this low fluid flow is insufficient to close valve 106.

No substantial fluid flow exists in valve 107 except downwardly therein and this only to the extent of hot water circulation to keep dispenser means 110 hot. The reverse is true of valve 106.

Poppet 66 is provided with a cylindrical body portion 70 having a radially projecting flange 71 fixed to or made integral with its lower end providing a valve to set on a valve seat or shoulder of housing 58 when the pressure below valve 106 exceeds the pressure thereabove as viewed in FIG. 2.

Flow of hot water in valve 106 when poppet 66 is in the position indicated at 67 is upwardly through a lower internal cavity defined by bore 63, through bore 65 of flange 64, upwardly between poppet 66 and upper and middle internal cavities 68 and 69.

As shown in FIG. 3, spider assembly 60 is made up of grooved sets of copper sheet material indicated at 73, welded both at joints 74 and 75 to pin 61 and bore 73 of fitting 77. Poppet 66 is also indicated at FIG. 4, as stated previously. It can be seen that poppet 66 is made of a piece of plastic material on a lathe or molded with flange 61 integral with cylindrical portion 70. The bore 76 of cylindrical portion 70 may be drilled. A plastic disc 77 may be press fit into the upper end of poppet 66, as shown in FIG. 4, and cemented in that position, if desired.

In FIG. 1, valve 106 is shown to the right of valve 107. This is not in accordance with the true mechanical details of their position. They have been shown in this position in FIG. 1 only for clarity and to illustrate that the same are provided with some connection to dispensing means 110 through support means 111. Correct relative positions on support means 111 are shown in FIGS. 5 and 6.

In FIG. 6, note will be taken that piston 123 is slidable vertically in cylinder 103. Springs at 124 and 125 urge piston 123 to an inoperative position spaced from seat means 112. Spring 124 is connected from an ear 126 on piston 123 to an ear 127 on support means 111. Spring 125 is connected from an ear 128 on piston 123 to another ear 129 on support means 111. Ear 126 of piston 123 extends outwardly through a slot 130 in cylinder 103. Similarly, ear 128 extends outwardly through a slot 131 in cylinder 103.

Piston 123 is provided with an annular recess 132 at its upper end, as viewed in FIG. 6, in which is positioned a rubber O-ring 133 to prevent the escape of hot water between the upper end of piston 123 and the upper end of cylinder 103 from leaking outwardly of cylinder 103 between the internal cylindrical bore 134 thereof and the external cylindrical surface 135 of piston 123.

Piston 123 is provided with a cylindrical passageway 136 extending therethrough, passageway 136 having a valve seat at 137 therein against which a ball valve 138 is normally setting when piston 123 is rendered inoperative. Ball valve 138 is biased against valve seat 137 by a spring 139 which is maintained in compression between ball valve 138 and a snap ring 140 positioned in an annular recess 141 in passageway 136.

The lower end of piston 123 is provided with a surface at 142 to mate with a surface 143 of seat means 112 to provide a cavity to receive one of the cavities 118 in means 113. Surfaces 142 and 143 may generally have the shape of cavities 118. Surfaces 142 and 143 are spaced apart a distance slightly smaller than the spacing between the surfaces of strips 114 and 115 in the position of cavities 118, whereby the coffee ground packets are compressed.

The lower end of piston 123 is also provided with an annular groove 144 in which another rubber O-ring 145 is positioned. In the embodiment of the invention shown in FIG. 6, the width of strips 114 and 115 is greater than the outside diameter of groove 144. Seat means 112 is provided with a flat approximately annular seat 146 on which marginal edges 116 and 117 of strips 114 and 115 lie. In its operative position, piston 123 is lowered to provide a fluid tight seal between it and seat means 112 around surfaces 142 and 143. This seal is provided by O-ring 145 and marginal edges 116 and 117 of strips 114 and 115, strips 114 and 115 being compressible filter paper. Marginal edges 116 and 117 of strips 114 and 115 thus act as a gasket in the same manner that O-ring 45 also acts as a gasket. For this reason, the use of groove 144 and O-ring 145 may be eliminated although the same are preferred for improved reliability. For example, if the production quality control of the surface of marginal edges 116 and 117 of strips 114 and 115 is not such that the same can be made approximately flat without any wrinkles, O-ring 145 nevertheless still produces a fluid tight seal with seat means 112.

Note will be taken that, as stated previously, nipple 109 connects valve 107 to cylinder 103. Nipple 109 may be slidable in a bore 147 of support means 111. Nipple 109 is threaded to cylinder 103 at port 108 as stated previously, and thereby holds cylinder 103 tightly against the one surface of support means 111. Nipple 109 is also threaded at 148, whereby a lock nut 149 may be employed to bear against the upper surface of support means 111 and hold nipple 109 in a fixed position relative to support means 111. Similarly, the lower end of pipe T 105 is threaded into port 102 of cylinder 103 and is provided with an additional thread at 150 having lock nut 151 thereon to hold pipe T 105 in a fixed position relative to support means 111, the lower end of pipe T 105 being slidable in a bore 152 through support means 111. A nipple 153 is also slidable in a bore 154 in support means 111. Nipple 153 is threaded to an output port 155 through surface 143 in seat means 112. Nipple 153 is also threaded at 156. A stop nut 157 is threaded onto nipple 153 to hold the same in a fixed position relative to support means 111. However, support means 112 and nipple 153 are movable vertically downward relative to support means 111 against the reaction of spring S.

In the operation of the machine shown in the drawings, when no demand is made on the machine, hot water is circulated through dispenser means 110 in the manner aforesaid through output pipe 25, through valve 107, into cylinder 103, upwardly in pipe T 105 through valve 106 and downwardly in input pipe 23. A fresh coffee packet or cavity 118 may be moved into position between piston 123 and seat means 112 between surfaces 142 and 143 either immediately before or immediately after a cup of coffee is dispensed. Timer 121 can produce this operation by its connection to mechanisms 119 and 120 shown in FIG. 1.

When a demand is made for a cup of coffee, timer 121 operates pump 101 through electric motor 122 for a predetermined length of time. When pump 101 supplies hot water to cylinder 103 from output pipe 25 through pipe 104 and pipe T 105, the pressure of this hot water within cylinder 103 will be transmitted upwardly through pipe nipple 109 and pipe T 105 to valves 107 and 106, respectively. For efficient operation, pump 101 need not have, but may have, a rapid rise time and may produce a rated output pressure within a fraction of a second. When there has been a small pressure rise in the hot water in cylinder 103 above piston 123, valves 106 and 107 are closed immediately and at a time prior to the time that valve 138 opens. The hydraulic pressure then of hot water in cylinder 103 drives piston 123 downwardly to a position such that a seal is made by marginal positions 116 and 117 of filter paper strips 114 and 115 and O-ring 145 with surface 146 of seat means 112. Up to this point, valve 138 remains closed. The force constant of spring 139 relative to those of springs 124 and 125 is such that valve 138 will not open until the said sealing engagement is effected between piston 123 and seat means 112. When such sealing engagement is effected, valve 138 opens and pump 101 drives water through passageway 136 and through coffee ground containing cavities 118. Brewed coffee then can be taken from the lower end of pipe nipple 153 after it passes through filter paper strips 114 and 115 surrounding cavities 118. The coffee liquor will then collect on surface 143 of seat means 112 and flow outwardly of port 155 in seat means 112 into nipple 153. Note will be taken that the surface 143 of seat means 112 is concave toward port 155 and a gravity flow of the liquor or brewed coffee collected on surface 143 will be toward port 155 which is located centrally of surface 143.

Note will be taken that the force supplied to piston 123 by the operation of pump 101 must be greater than the force supplied thereto by return springs 124 and 125. When piston 123 is in sealing engagement with seat means 112 and pump motor 122 is de-energized at the end of its running cycle, valve 138 will close before piston 123 rises. If pump 101 would not permit fluid flow therethrough from pipe 104 to output pipe 25 and if valves 106 and 107 would not permit the escape of water upwardly therethrough and subsequently downwardly into tank 17, piston 123 would not move upwardly to its inoperative position. For this reason, some special construction in valves 106 or 107 or in pump 101 are provided to permit the passage of water therethrough when piston 123 rises from its operative position to its inoperative position. Such a construction may be provided in any number of ways. For example, pump 101 may be a conventional rotary pump including a worm type metal rotor and a rubber stator resiliently engaging the same, the stator having an internal thread somewhat different from that of the thread of the worm on the rotor. In such a case, the stator will expand due to the back pressure thereon and will permit piston 123 to rise by the stator expansion or by a "leak" created between it and the rotor. Alternatively, valve 106 or valve 107 may be a conventional spring biased valve with the spring bias thereof employed to bias the valve to an open position. If the maximum output pressure of pump 101 in this case is, for example, greater than 10 p.s.i. and the spring biased valve closing pressure is 10 p.s.i., the valve will close when pump 101 is operated and will open at all other times. In the machine disclosed in FIGS. 1 to 8, inclusive, only valve 107 may be such a valve, if desired.

Notwithstanding the fact that the above described worm type motor pump operates satisfactory, pump 101 may also be a rubber impeller type pump wherein the blades of the impeller contact the surfaces of the body of the pump to supply a metered amount of water for a predetermined angular movement of the motor thereof attached to the impeller equal to the angular spacing of the rubber blades of the impeller.

Another alternative for pump 101 is a centrifugal pump. Such a centrifugal pump is disclosed herein in connection with the embodiment of the present invention shown in FIGS. 9, 10 and 11.

In the machine shown in FIG. 1, dispenser means 110 may also be indentical to the electrically operated dispenser means shown in said co-pending application in accordance with the feature of the present invention wherein pump 101 is directly connected from output pipe 25.

Note will be taken that the force constant of spring S is not critical in that seat means 112 will move downwardly somewhat when piston 123 forces the same in that direction.

In accordance with the present invention, an alternative embodiment may be provided as shown in FIGS. 9, 10 and 11. In FIG. 9, note will be taken that the apparatus is identical to that shown in FIG. 1 except that instead of dispensing apparatus 100, a somewhat different dispensing apparatus 100' is employed.

Note will also be taken that in FIG. 9, water supply means 11 is well above the top of any structure in dispensing apparatus 100' to maintain the same full of water at all times.

In order to enable the filling of all of the conduits of dispensing apparatus 100' with water, a conventional centrifugal pump 200 shown therein may be provided with a conventional plug 201 in it. Centrifugal pump 200 is connected from an interior bore 202 of a brewing head cylinder 203 to pipe 23. Note will be taken that pipe 25 is connected with bore 202 through a normally open float valve 204. Float valve 204 is provided with a poppet 205 identical to poppet 66. Poppet 205 has an average density greater than water. The position of poppet 205 is determined by a pin 206 on which poppet 205 rests. Pin 206 is fixed to a plug 207 threaded into a bore 208 of cylinder 203 of centrifugal pump 200 which is operated by an electric motor 209 that is controlled by a timer 121' that may be identical to timer 121. As shown in FIG. 10, timer 121' is also connected to a motor 210 that rotates a square sprocket 211. Sprocket 211 lowers means 113 vertically through cylinder 203 as shown in FIG. 11. Means 113 is taken from a supply roll 212 on a shaft 213.

Cylinder 203 and everything contained therein may be identical to cylinder 103. Alternatively, cylinder 203 may contain a piston 214 having a bore 215 having a shoulder 216 on which a valve 217 rests. Valve 217 is biased to a closed position by a helically coiled spring 218 which is compressed between a shoulder 219 in bore 215 and a follower 220 fixed with valve 217.

Note will be taken that a brewed coffee liquor receiving chamber 221 is employed with the embodiment of the invention shown in FIG. 11 which is different in construction from seat means 112 shown in FIG. 6. A chamber 221 is provided with a sealing face 222 to be engaged by an O-ring 145' on piston 214. However, face 222 has a round hole 223 therethrough which communicates with an inner cavity 224 having a coffee outlet 225. A circular plate 226 is positioned in hole 223 spaced from the circular edge of face 222 to support a coffee bag. The position of plate 226 is adjustable. Plate 226 for this reason is fixed with a shaft 227 threaded through chamber 221.

Note will be taken that centrifugal pump 200 is directly connected to cylinder 203 by a conduit 228.

From the foregoing, it will be appreciated that sprocket 211 may turn exactly 90° and, immediately prior to or immediately after the actuation of centrifugal pump 200, may precisely position a coffee bag between piston 214 and plate 226. This is made possible due to the fact that fresh coffee grounds are lowered into the brewing head. That is, it is easy to control the position of the layers 114 and 115 when they are dry. When they become wet, indexing becomes a problem but for the lowering of the dry portion of the layers into the brewing head. Sprocket holes 113' will tear out of layers 114 and 115.

Note will be taken that water flows through a small bore 215 in piston 214. Plate 226 is completely solid but has a concave configuration. Water is therefore forced into the center of one side of cavity 118. However, this water must flow to the outer periphery of cavity 118 in order to absent itself from the space between the end of piston 214 and plate 226. Due to this radial flow of water, an improved coffee liquor extraction is achieved.

In addition, a conventional valve may be substituted for valve 204 in FIG. 11 if pipes 23 and 25 are reversed.

It is an outstanding feature of the present invention that the coffee grounds in cavities 118 are compressed while hot water is passed therethrough. It has been found that apparatus for extracting a coffee liquor in this manner is less expensive than those practiced in the prior art because stronger coffee can be brewed in this manner. Moreover, the coffee so brewed is more palatable than that made in accordance with the prior art.

Although only a few specific embodiments of the invention have been shown and described, many changes and modifications thereof will, of course, suggest themselves to those skilled in the art. The invention is therefore not to be limited to the embodiments selected for this disclosure, the true scope of the invention being defined only in the appended claims.

What is claimed is:

1. Apparatus for making brewed coffee comprising: two bodies, one of said bodies being movable toward and away from the other of said bodies, said bodies having facing concave surfaces; means for locating a water permeable bag of coffee grounds between said concave surfaces; means for moving said bodies into contiguous positions with their peripheral portions spaced apart such that said surfaces hold the coffee in said bag in compression, one of said bodies having a central hole therethrough intercepting the corresponding concave surface thereof, the other of said bodies having an uninterrupted concave surface; means for forcing hot water through said hole into the space between said concave surfaces and radially outwardly from the center thereof; and means for collecting a coffee liquor emanating about the entire periphery of said concave surfaces.

2. Apparatus for making brewed coffee comprising: a pair of closure members, said members having facing recesses, at least one of said members being movable toward and away from the other in a substantially horizontal direction; a supply of interconnected water permeable bags of coffee grounds; indexing means positioned vertically above said members, said indexing means being actuable to suspend each successive bag in a vertical position between said members in spaced relation to each; power means actuable to move at least one of said members toward the other to enclose each successive bag in a cavity between said members; fluid pressure means actuable to force hot water through said cavity and a bag therein; and means to deactuate said power means to return said members to relative positions in which both are out of contact with said bag.

3. Apparatus for making brewed coffee comprising: a pair of closure members, said members having facing recesses, at least one of said members being movable toward and away from the other in a substantially horizontal direction; a tape of interconnected water permeable bags of coffee grounds, said tape having a series of sprocket holes therein; indexing means including a drive sprocket for said tape positioned vertically above said members to suspend each successive bag in a vertical position between said members in spaced relation to each; power means actuable to move at least one of said members toward the other to enclose each successive bag in a cavity between said members; fluid pressure means actuable to force hot water through said cavity and a bag therein; and means for deactuating said power means to return said one member to a retracted position wholly out of contact with said bag immediately after deactuation of said fluid pressure means, said indexing means being positioned to hold said bag in a manner to swing by force of gravity to a position wholly out of contact with the other of said members when said one member is returned to its retracted position.

4. Apparatus for making brewed coffee comprising: a pair of closure members, said members having facing recesses, at least one of said members being movable toward and away from the other in a substantially horizontal direction; a supply of interconnected water permeable bags of coffee grounds; indexing means positioned vertically above said members, said indexing means being actuable to suspend each successive bag in a vertical position between said members in spaced relation to each; power means actuable to move at least one of said members toward the other to enclose each successive bag in a cavity between said members; fluid pressure means actuable to force hot water through said cavity and a bag therein; and means for deactuating said power means to return said one member to a retracted position wholly out of contact with said bag immediately after deactuation of said fluid pressure means, said indexing means being positioned to hold said bag in a manner to swing by force of gravity to a position wholly out of contact with the other of said members when said one member is returned to its retracted position.

References Cited by the Examiner

UNITED STATES PATENTS

| | | | |
|---|---|---|---|
| 772,472 | 10/1904 | Neill | 100—73 |
| 1,258,499 | 3/1918 | Taber | 226—76 |
| 1,538,210 | 5/1925 | Offenhauser | 100—73 |
| 2,402,280 | 6/1946 | Green | 137—334 |
| 2,529,395 | 11/1950 | Hummel | 99—302 |
| 2,598,377 | 5/1952 | Herrera | 99—303 X |
| 2,669,257 | 2/1954 | Ramsey | 251—73 |
| 2,692,113 | 10/1954 | Larkin | 251—73 |
| 2,939,380 | 6/1960 | Parraga | 99—283 |
| 3,012,571 | 12/1961 | Castillo | 137—334 |
| 3,018,933 | 1/1962 | Rookus | 226—76 |
| 3,019,719 | 2/1962 | Parraga | 99—287 |
| 3,030,874 | 4/1962 | Fiori | 99—287 |
| 3,048,070 | 8/1962 | Groves. | |
| 3,085,495 | 4/1963 | Rosander | 99—283 |
| 3,088,826 | 5/1963 | Renner et al. | 99—71 |
| 3,120,440 | 2/1964 | Ross | 99—71 |
| 3,125,945 | 3/1964 | Hanson et al. | 99—289 |
| 3,143,058 | 8/1964 | Jannin | 99—283 |
| 3,143,954 | 8/1964 | Nesmith | 99—289 |
| 3,143,955 | 8/1964 | Rockwell | 99—289 |

FOREIGN PATENTS

| | | |
|---|---|---|
| 224,287 | 11/1962 | Austria. |
| 1,184,141 | 2/1959 | France. |
| 808,538 | 2/1959 | Great Britain. |
| 939,813 | 10/1963 | Great Britain. |
| 943,913 | 11/1963 | Great Britain. |
| 969,173 | 9/1964 | Great Britain. |
| 509,257 | 1/1955 | Italy. |

WALTER A. SCHEEL, *Primary Examiner.*

A. LOUIS MONACELL, *Examiner.*

M. W. GREENSTEIN, S. P. FISHER,
*Assistant Examiners.*